INVENTORS
GARRET L. SCHUYLER
PHILIAS H. GIROUARD
MAURICE H. BALLER
BY
*G. D. O'Brien*
ATTORNEY

FIG. 6

Jan. 27, 1959   P. H. GIROUARD ET AL   2,870,678
PROJECTILE LAUNCHER

Filed April 11, 1946   8 Sheets-Sheet 6

INVENTORS
GARRET L. SCHUYLER
PHILIAS H. GIROUARD
MAURICE H. BALLER
BY
ATTORNEY

INVENTORS
GARRET L. SCHUYLER
PHILIAS H. GIROUARD
MAURICE H. BALLER

BY

ATTORNEY

United States Patent Office 2,870,678
Patented Jan. 27, 1959

2,870,678

PROJECTILE LAUNCHER

Philias H. Girouard, Garret L. Schuyler, and Maurice H. Baller, Washington, D. C., assignors to the United States of America as represented by the Secretary of the Navy Application April 11, 1946, Serial No. 661,260

15 Claims. (Cl. 89—1.7)

(Granted under Title 35, U. S. Code (1952), sec. 266)

This invention relates to automatic projectile launching devices, and more particularly to automatic rocket launchers.

One object of the invention is to provide a projectile launching device in which the guides for the initial flight of the projectiles oscillate between firing positions and a loading position in alignment with a hoist which supplies ammunition to the guides.

Another object of the invention is to provide a projectile launching device in which a guide for directing the initial travel of the projectile is movable between a loading position and a firing position, the firing position being defined by an adjustable stop means operated by remote control means or the like.

Another object of the invention is to provide a projectile launching device of the type referred to above in which all of the operations of the device are completely automatic after a projectile has been placed in the hoist which feeds ammunition to the device. In order to carry out this object of the invention, a hydraulic electric operating system is provided and appropriate safety interlocks are included in the system to insure the proper sequence of operations in the mechanism.

A further object of the invention is to provide a device of the type referred to above which is of minimum size and weight so as to be useful on small ships and which requires no personnel above decks for its operation, the only human assistance necessary being personnel stationed below decks to place ammunition in the ammunition hoist and personnel stationed at a remote position to control the aiming and firing of the weapon.

Another object of the invention is to provide a launcher of the type described above which is automatically controllable in train and elevation from a remote position, such as a gun director.

These and other objects of the invention will be apparent from the following specification and the accompanying drawings, in which.

The embodiment of the invention shown in the accompanying drawings is a twin launcher for spin stabilized rockets of approximately 5" caliber. The two rocket launching tubes are supported by a mount to which is assembled a rocket hoist for feeding rockets to the launchers from below decks. The rocket launcher part of the assembly consists principally of a remotely controlled stop known as the "dummy gun" which is movable in train with the mount and is movable in elevation independently of the mount by remote control means such as a gun director or other fire control means, and the rocket launching tubes which are oscillated from a vertical loading position in alignment with the upper end of the ammunition hoists to a firing position which is defined by their contact with the dummy gun. The tubes thus oscillated serve alternately as the top of the hoist and as firing tubes during the automatic cycle.

The launcher is fully automatic after the ammunition has been placed in the lower end of the hoist which is of the reciprocating type operated by means of a hydraulic piston connected to a rocket lifter by a wire rope operating over a series of sheaves. A series of interlocks provides for automatic actuation of all elements of the mechanism after the rockets have been loaded into the hoist.

In operation, rockets are loaded manually onto the rocket lifter at the lower ends of the hoist tubes on a deck below the deck on which the mount is located. When both rockets have been loaded into the hoist, and the hoist shutters have closed and the launcher tubes are in their vertical loading position, the hoist automatically lifts the rocket upwardly and positions them in the launching tubes. The rockets themselves moving into the launching tubes act as cams to operate switches which initiate the flow of hydraulic fluid to a cradle operating cylinder which moves the tubes with the rockets in them to the firing position. Electrical contacts carried by the dummy gun make contact with the rockets in the launching tubes as the tubes approach the firing position, and a firing switch mounted on the dummy gun is actuated when the launcher tubes are in alignment with the dummy gun to fire the rockets electrically, a 0.3 second delay between the firing of the two rockets being provided by conventional electrical means.

As the rockets leave their respective launching tubes, interlock switches are actuated by plungers extending into the tubes and the launcher tubes are automatically returned to the loading position in alignment with the upper end of the hoist after the second rocket leaves its launching tube. This cycle is repeated as long as rockets are loaded into the hoist and the firing power is supplied, all elements of the cycle being fully automatic except for the above mentioned loading of rockets into the hoist. In firing tests, the device has fired fifteen salvos or thirty rockets per minute, using 5" spin stabilized rockets.

In more detail, the embodiment of the device shown in the drawings may be most easily described in four parts, namely: the above deck mount and rocket launching tubes and related elements, the hoist mechanism, the hydraulic-electric operating system for the mechanism, and the firing circuit.

The above-deck mount and rocket launching mechanism comprises a carriage or mount 20 of the conventional type used for guns, having trunnion bearings 24 for trunnions 21 which pivotally support a "dummy gun" 22 and a cradle 23. The cradle rotates on trunnion bearings 24 about the axis of the trunnions 21 and is pivotally oscillated or reciprocated in elevation by a hydraulic cylinder 25 through a crosshead 25b, a cradle operating link 25c and a crank arm 26 independently of dummy gun movement. The cradle casting 23 is preferably a steel casting with provision for mounting and maintaining parallel a pair of missile launching tubes, missile guides, barrels, or the like 27, for directing missiles in their initial course, and for clamping the launching tubes so that they form a rigid structure with the cradle.

The launching tubes 27 are preferably of seamless steel and have an inside diameter of approximately 5¾ inches. They are approximately 49" long and carry three steel launching rails 28 welded to their interior throughout most of their lengths and spaced 120° apart so as to form a 5" diameter inside the rails 28. The lower rear portion of each launcher tube is cut away at 27a so that the hoist lift does not interfere with movement of the tubes away from the loading position as will be explained presently. Each tube has an opening 45 in its upper surface near its rear end for a purpose to be described presently.

A rocket latch assembly is mounted on the rear end of each launching tube for the purpose of maintaining the rockets in the tubes after the hoist no longer supports them, that is, after the launching tubes are rotated away from their loading position. Each rocket latch assembly consists of a latch 29 pivotally mounted on the rocket launching tube at 30 by means of a shaft 31 which carries a downwardly extending lug 32. The lug 32 is adapted to move the operating arm 33 of a normally closed switch 34 when the latch is depressed. Movement of a projectile into the rear end of the launching tube depresses latch 29, rotates shaft 31 and causes lug 32 to actuate the switch 34 to its open circuit position to insure that the launching tubes are not moved away from the loading position during the loading process as will be explained more fully presently. Spring 35 returns the latch to its inward or rocket retaining position as soon as the new round is pushed past the latch, allowing switch 34 to return to its normally closed condition. Switches 34 are connected into the interlock circuit through connector box 23a mounted on the cradle 23.

Figure 5:
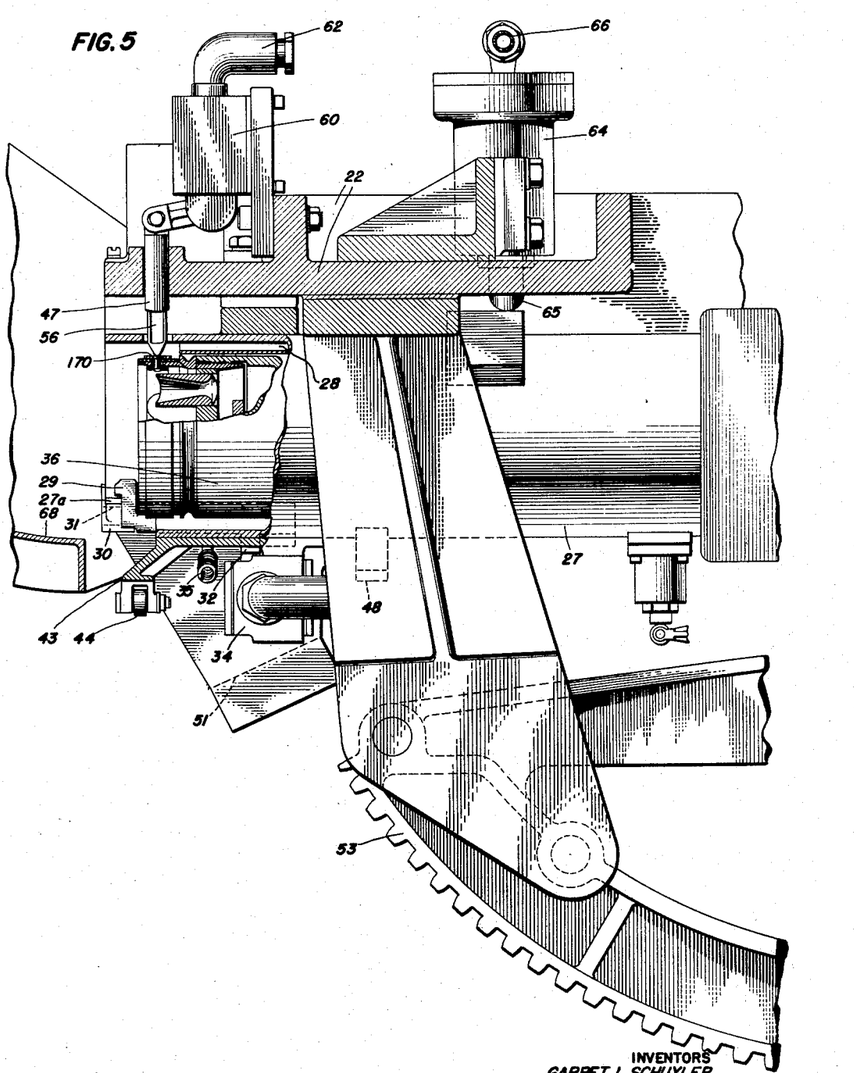
Fig. 5 is a detailed cross-sectional view taken on line 5—5 of Fig. 3 showing the launching tubes in firing position with a portion of the rear end of one of the tubes broken away to show a projectile in the tube ready for firing.

As shown in detail in Fig. 5, each latch 29 in its latching position projects inwardly into its launching tube a sufficient distance to retain a rocket 36 in the tube after the launching tube is moved from its loading position. Thus the latches 29 serve to retain the rockets in the launcher tubes and to actuate safety switches to prevent movement of the launcher tubes away from the hoist before the rockets are completely loaded into the tubes.

The mechanism for indicating to the control system when rockets are in the launching tubes comprises a cradle interlock mechanism mounted on the under side of the cradle assembly just behind the cradle casting 23. This mechanism for each launching tube includes a spring-loaded plunger 40 which normally extends radially into the launcher tube and is reciprocable so as to operate a switch 41 mounted outside the launching tube on the cradle when moved outwardly by the ogive of the rocket being loaded into the launching tube.

Figures 9, 10:
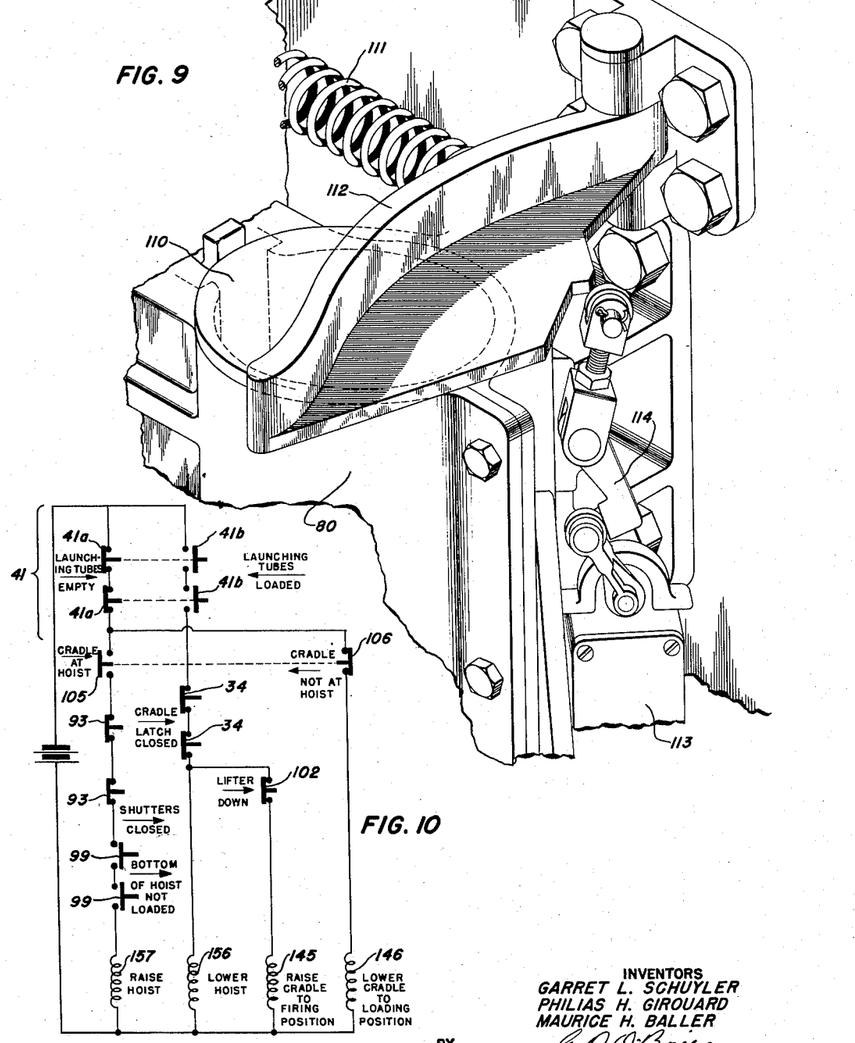
Fig. 9 is a detailed perspective view of the operating linkage for the switch which is actuated by the hinged hoist tube covers.
Fig. 10 is a wiring diagram of the electrical interlock system.

Each switch 41 comprises two pairs of contacts 41a and 41b which are connected into the interlock circuit through connector box 23a mounted on the cradle 23. When a launcher tube is empty, contacts 41a are closed and contacts 41b are open. As soon as a rocket is moved far enough forward in a tube during the loading to move the plunger 40 outwardly to operate the switch 41, the contacts 41a are opened and the contacts 41b are closed, and the switch 41 is maintained in this condition as long as a rocket is in the tube. As shown in Fig. 10, the contacts 41a are in the hoist raising circuit and in the cradle lowering circuit so that only when both launcher tubes are empty and contacts 41a are closed can the cradle be rotated to the vertical or loading position and only then is the hoist raised. The contacts 41b are in the cradle raising circuit so that only when rockets are in the tubes and both plungers 40 are moved outwardly can the cradle be pivoted to the firing position.

The under side of the rear end of each of the launcher tubes carries a bracket 43 on the outer end of which is mounted a roller 44 for the purpose of actuating the cam surfaces on the upper sides of the hoist tube covers 110 as will be described in more detail presently.

A bracket 46 is mounted between the rear ends of the two launching tubes and supports an adjustable screw 47 which serves a purpose to be explained presently. A lug 48 is welded onto the lower portion of the rear end of the right launcher tube for actuating switches 105, 106 as will be explained presently.

Figures 2, 12:
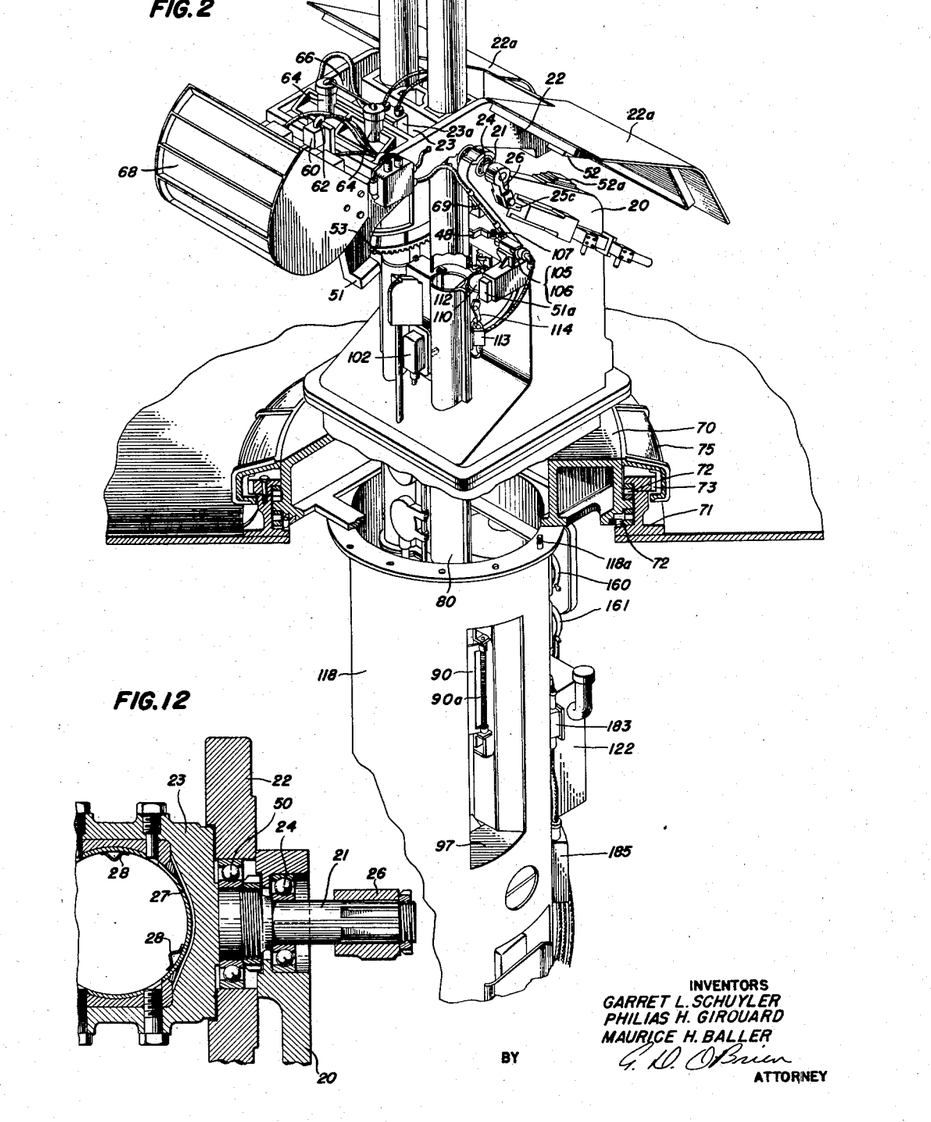
Fig. 2 is a perspective view of the launcher and hoist, partly in section, showing the launching tubes in the loading position.
Fig. 12 is a detail section taken on line 12—12 of Fig. 1.
Figure 3:
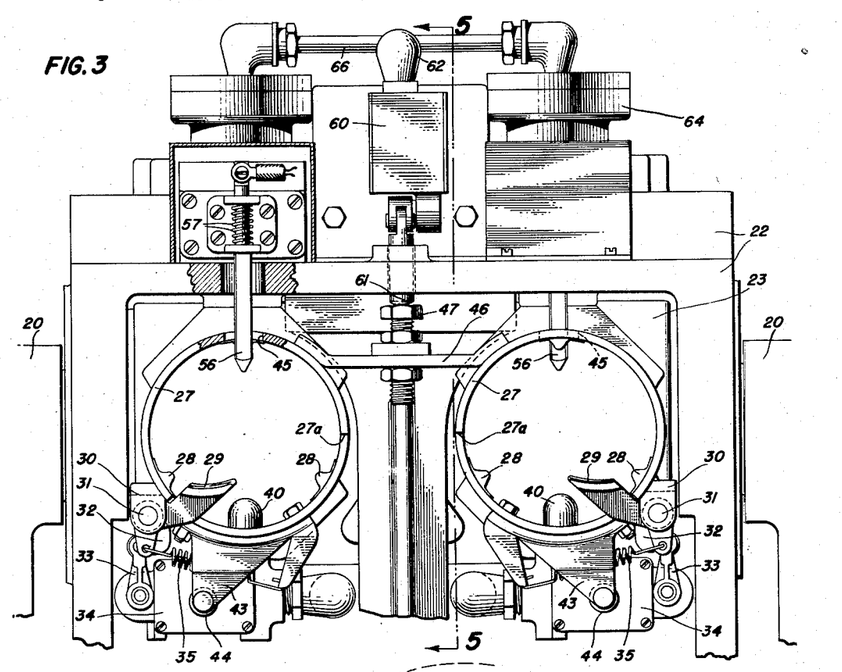
Fig. 3 is a rear elevational view of the launching tubes in unloaded condition.
Figure 4:
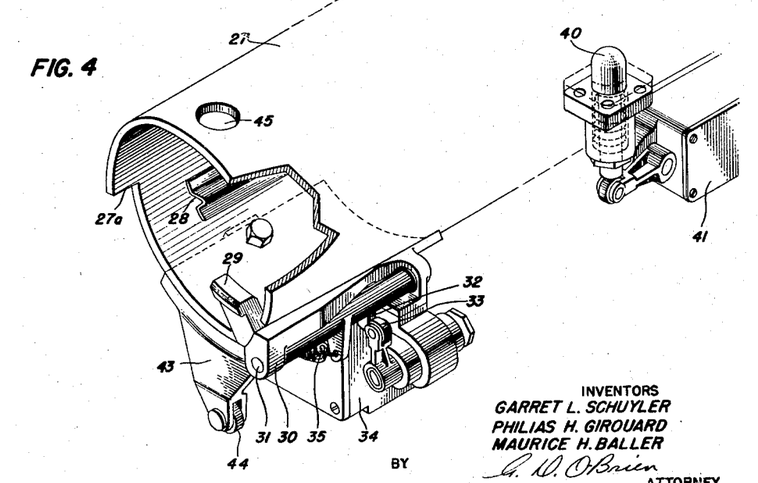
Fig. 4 is a detailed perspective view of the rear end of one of the launching tubes showing the retractable rocket retaining lugs and switches operated thereby, and the cradle interlock plunger and switch.

In order to protect the switches, cables and other mechanism on the front of the cradle from the rocket blast, it is desirable to provide a forward blast shield to protect these elements. The blast shield as shown in Fig. 2 comprises a pair of thin metal plates 22a mounted on the downwardly sloping upper surfaces of the forward portion of the dummy gun so as to extend outwardly therefrom a distance of approximately 24" on each side of the dummy gun and a distance of approximately 15" forwardly from the forward end of the dummy gun, the forward portion of the blast shield being bent downwardly at an angle of approximately 30°. If desired, the blast shield may comprise a metal sheet mounted on the forward end of the launcher tubes and extending approximately 6" radially from both launcher tubes.

The purpose of the dummy gun assembly is to provide a registration unit for aligning the rocket launching tubes in elevation with the signal output of a director or other controlling mechanism (not shown). The dummy gun 22 comprises a steel casting in the form of a rectangular frame provided with machined surfaces for mounting the components of the dummy gun assembly and function as a launching guide stop means or directing means for determining the extent of pivotal movement of the launching guides from loading position to launching position. The dummy gun is mounted on a pair of ball bearings 50 surrounding the trunnions 21 of the cradle assembly so that the dummy gun is movable in elevation on the same axis as the cradle assembly but independently thereof. At the rear end of the dummy gun, a pair of limit stop contacting arms 51 are cast integrally with the dummy gun frame to limit movement of the dummy gun in elevation by their contact with resilient limit stops 51a mounted on the carriage. A pair of outwardly extending depression limit stop members 52 are provided on the forward end of the frame to cooperate with resilient depression limit stops 52a on the carriage.

The dummy gun is movable in elevation by means of an elevating arc 53 attached to the bottom thereof and driven by an elevating pinion 54 which is controlled in any conventional manner by remote control means, such as a gun director (not shown).

A pair of firing contact pins 56 is mounted at the rear end of the dummy gun chassis, electrically insulated therefrom. One of these firing pins extends downwardly through opening 45 of each launching tube to engage the contact band 170 of a rocket 36 when the rocket is in the firing position within the launcher tube. Springs 57 urge the contact pins downwardly to insure good electrical contact with the rockets. Electrical firing current is conducted to the firing pins 56 through suitable electrical conductors which connect the pins with the firing circuit of the launcher as will be described in detail presently.

A so-called "firing interlock mechanism" is mounted on the rear of the dummy gun casting between the firing pins 56 for the purpose of closing the firing circuit when the launching tubes are in alignment with the dummy gun. The mechanism comprises a switch 60 which is operable by a spring loaded plunger 61 extending downwardly into the path of the adjustable firing screw 47 which is carried by bracket 46 on the rear ends of the launching tubes. The spring (not shown) holds the plunger in its downward position in which the switch 60 is open but permits upward movement of plunger 61 to close switch 60 when the rocket launching tubes are moved upwardly to their firing position. The switch 60 is connected into the firing circuit (Fig. 11) by suitable electrical connectors attached to socket 62 as will be described in detail presently.

A pair of buffers 64 having downwardly extending plungers or bumper rods 65 are mounted on the upper side of the dummy gun to contact launching tubes 27 to reduce the shock when the launching tubes are moved into alignment with the dummy gun and to provide positioning abutments for said tubes. These buffers are preferably of the hydraulic type and include a pressure equalizing tube 66 connecting the interiors of the two buffers.

Buffering of the launching tubes when they are moved to their loading position is accomplished by a pair of buffers 69 mounted on the carriage 20 and lying in the paths of the launching tubes when they move to their loading position.

The rear end of the dummy gun is provided with a scoop type blast deflector 68 aligned with the launching tubes when they are in firing position. The deflector turns the gases of combustion from the rocket propellant upwardly through an angle of approximately 120° so as to prevent flame damage to structure and/or personnel behind the rocket launcher.

For positioning the dummy gun and rocket launching tubes in train, the carriage 20 is mounted on a platform 70 which is mounted in a conventional way for rotation on a stand 71 by means of suitable bearings 72. A gear toothed training circle 73 is fixed to the stand 71. Movement of the platform in train with respect to the fixed training circle is accomplished through a training pinion gear (not shown) carried by the platform 70 and rotatable by conventional remote control means from a director (not shown) or other controller. A suitable cover 75 is attached to the platform 70 so as to rotate therewith and serves the purpose of protecting the training circle and bearings from dirt, water, or other extraneous matter which might damage or impair the efficiency of the mechanism. Conventional electric or electric-hydraulic power drives are utilized to position the mount in train and to position the dummy gun in elevation.

A rocket hoist assembly of the reciprocating type is provided to lift simultaneously a pair of rockets from the deck below the mount into the launching tubes or missile guides 27. The hoist comprises a pair of loading or hoist guide tubes and a central guide channel formed by bolting together a pair of nearly identical bronze castings 80. An opening is provided at the lower end of each tube for loading rockets into the loading or hoist tubes. Suitable machined surfaces are provided on the castings 80 for mounting all the components of the hoist assembly so that the entire hoist may be removed from the rocket launcher assembly as one unit.

A rocket lifter 81 comprising a steel casting rides in the guide channel located between the two hoisting tubes formed by the hoist castings. A pair of arms or missile transporters 82 extend into each of the hoist tubes through longitudinal slots (undesignated) which extend along the adjacent sides of the tubes, so that both rockets are raised simultaneously.

Figure 6:
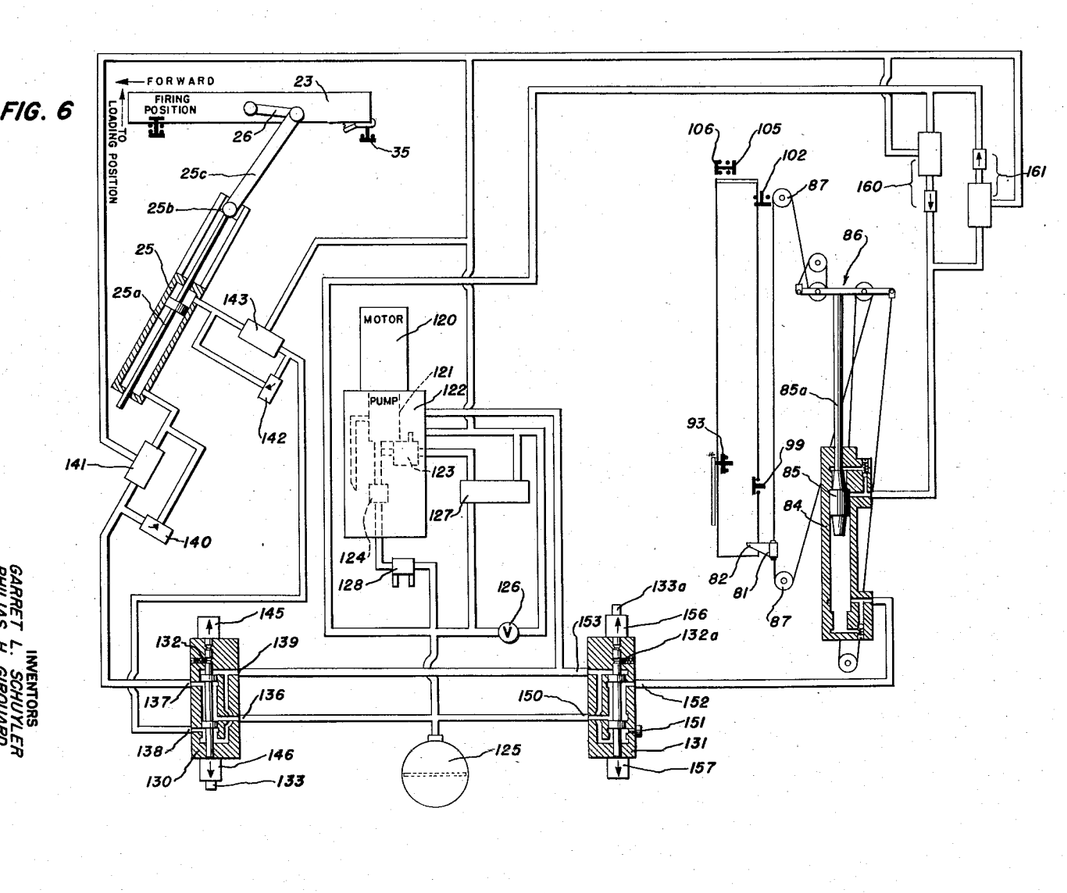
Fig. 6 is a schematic diagram of the hydraulic system for operating the device.

Power for driving the lift 81 is provided by a hydraulic hoisting cylinder 84 mounted on the lower part of the hoist castings. The piston 85 of the hoisting cylinder has a stroke of approximately 28" and by means of a 3:1 ratio cable and sheave system denoted generally by the numeral 86 produces an 84" stroke at the lifter 81. The cable and sheave system actuable by the piston rod 85a, is conventional in arrangement and is believed to need no detailed description in view of this fact and the clear showing of Fig. 6. As also shown in Fig. 6, separate cables and sheaves are provided for raising and lowering the lifter and suitable guide sheaves 87 and mounted on the hoist casting.

Figure 1:
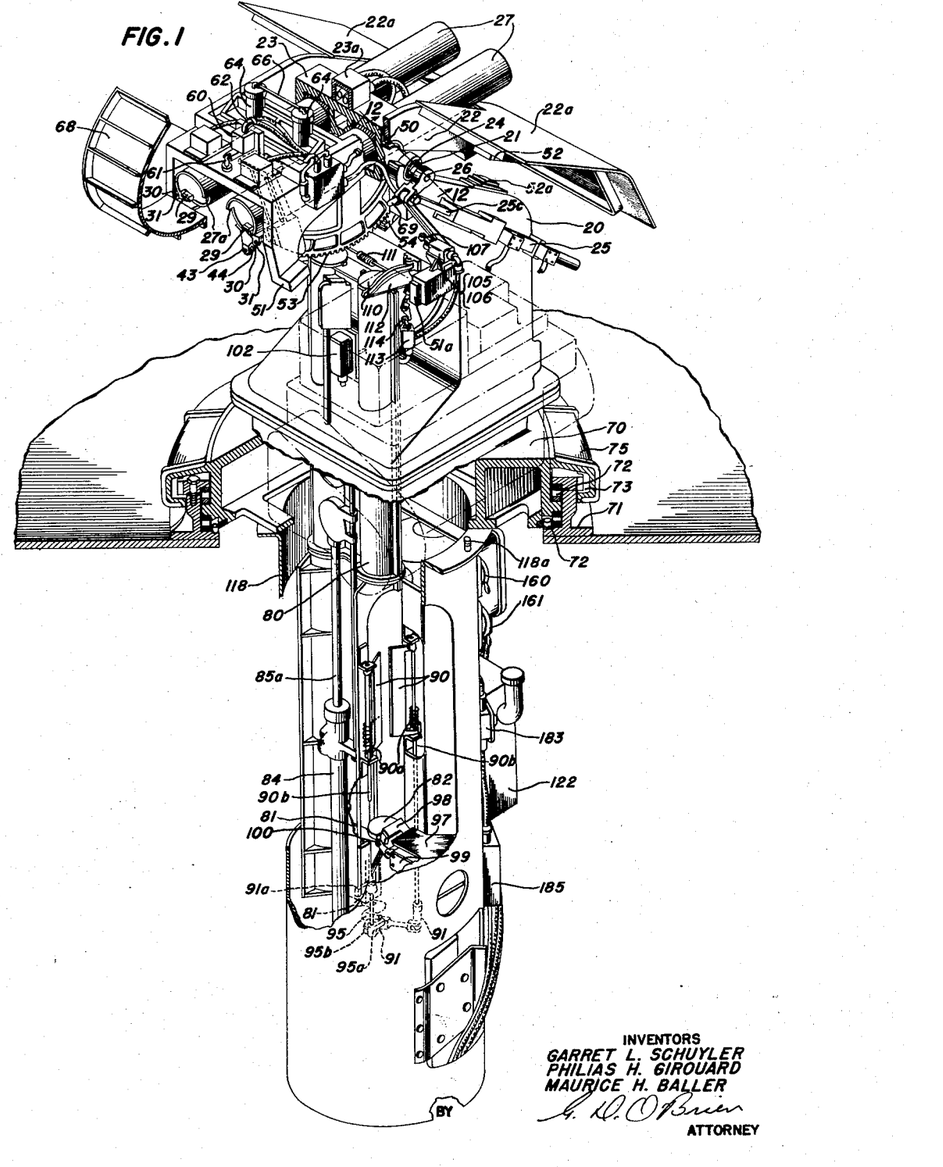
Fig. 1 is a perspective view of the launcher and hoist, partly in section, showing the launching tubes in firing position.
Figures 7, 8:
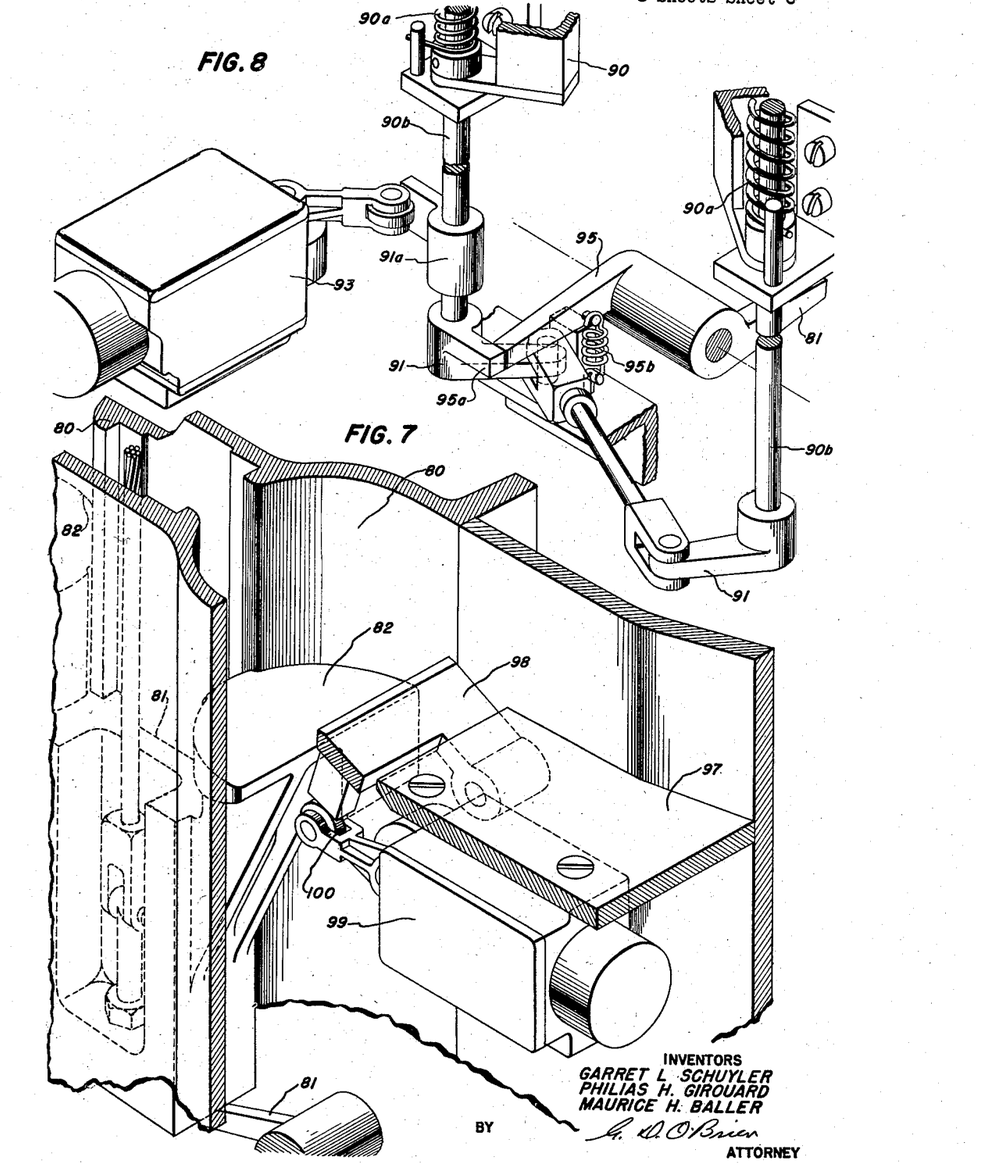
Fig. 7 is a detailed perspective view of the lower hoist interlock mechanism showing the hinged treadle plate and electrical switch operated thereby.
Fig. 8 is a detailed perspective view of the interlock levers connecting the two rocket retaining gates and the electrical switch operated thereby.

Each of the hoist loading openings at the lower end of the hoist is closed by a pair of rocket retaining or loading gates 90 hinged to the hoist castings as shown in Fig. 1 and resiliently urged to a closed position by springs 90a. The shutters or loading gates 90 of each hoist tube are interconnected as shown in Fig. 8 by means of linkage arms 91 which are fixed to pivot shafts 90b which are pinned to gates 90. A lug 91a fixed to one of the shafts 90b operates a normally closed interlock switch 93 to open the switch when the gates are open and to permit the switch to close only when the gates 90 are entirely closed. Switches 93 are included in the electrical circuit for raising the hoist as shown in Fig. 6, as will be explained presently in greater detail. When switches 93 are open indicating that the gates 90 are open, the hoist cannot be raised.

A locking lever 95 interconnects the gates 90 with the rocket lifter to lock the gates in their closed positions to prevent rockets from being loaded into the hoist when the lifter is not at the bottom of the hoist tubes. One end of lever 95 abuts an arm 95a on one of the shafts 90b to prevent rotation of the shaft and opening of the gates when the lift 81 is not resting on the opposite end of the lever. A spring 95b retains the lever 95 in its gate locking position until the lift 81 moves to the bottom of the tube at which time it disengages the lever from arm 95a to permit opening of the gates 90.

A rocket loading platform 97 is provided at the lower end of the opening in the bottom of each hoist to assist in loading the rockets into the hoists. The rockets are placed base down on the platform 97 and pushed through the shutters 90 into the hoist tube.

The lower hoist interlock (Fig. 7) is carried by the loading platform 97 opposite the lower position of the lifter arms 82 for the purpose of indicating to the control system when rockets are in the lower end of the hoist. This interlock in each tube comprises a treadle plate 98 hinged to the inner end of the loading platform 97 and urged upwardly by a spring (not shown). Each treadle 98 operates a switch 99 by means of linkage 100 so that when a rocket is loaded into the hoist, the base of the rocket rests partly on and depresses the hinged treadle 98 to close the switch 99 in the control circuit. As shown in Fig. 10, the switches 99 are included in the circuit for raising the hoist so that only when rockets are in the lower end of each hoist tube and both switches 99 are closed thereby can the hoist car be raised.

An upper hoist interlock mechanism is provided near the top of the hoist castings for the purpose of indicating to the control circuit when the lifter 81 is at the top of the hoists. The interlock comprises a normally closed switch 102 whose operating arm extends through an opening in one of the hoist castings into the guide channel between the two hoist tubes. Switch 102 is opened by the lift 81 when the lift is at the top of the hoist and closes when the lift is not at the top of the hoist. As shown by Fig. 10, the switch 102 is connected into the circuit which pivots the cradle to the firing position, so that only when the hoist lift is not at the top of the hoist and the switch 102 is closed can the cradle be pivoted to the firing position.

A launching tube interlock is located near the top of the hoist and serves the purpose of indicating to the control circuit when the launcher tubes are in the loading position in alignment with the loading tubes and their rear ends in registry with the upper ends of the loading tubes. This interlock comprises a pair of switches 105 and 106 so arranged that when one of the pair of switches is open the other is closed as is shown in Fig. 10. These switches are mounted on the carriage 20 as best seen in Figs. 1 and 2 and have an operating arm 107 which is actuated by lug 48 welded onto the right launching tube (see Fig. 2). Switches 105 and 106 are so arranged that when the launching tubes are in the loading position, switch 105 is closed and switch 106 is open, and when the launching tubes are not in the loading position, switch 105 is open and switch 106 is closed. Switch 105 is in the hoist raising circuit so that the launching tubes must be in the loading position and switch 105 closed before the hoist is raised. Switch 106 is in the cradle lowering circuit and serves the purpose of maintaining solenoid 146 deenergized during non-firing periods when the mechanism is ready for action but the order to load has not been received.

A hinged cover cap 110 is provided at the top of each hoist tube for the purpose of preventing the blast from the rockets from passing down the hoist to the deck below with the resultant danger of prematurely detonating or igniting a rocket in the hoist and/or injuring personnel stationed at the loading end of the hoist. These hoist covers are normally maintained in closed positions by a spring 111 connected to each of the covers so as to urge them inwardly toward their closed positions. Each cover is provided with an upwardly extending cam surface 112 extending into the path of the roller 44 on the corresponding rocket launching tube so that movement of the launching tubes to the loading position brings the rollers 44 into contact with the cam surfaces 112 and moves the hoist covers to the open position. A normally closed switch 113 is mounted on the outer surface of each hoist tube near the upper end thereof as shown in detail in Fig. 9. Levers 114 are provided for actuating the operating arms of the switches 113 to open the switches when the hoist covers are opened. Switches 113 are connected in the firing circuit which will be discussed presently. When opened by opening of the hoist covers, switches 113 interrupt the firing circuit, thus assuring that a rocket is not fired in the launching tubes as long as either hoist cover is open.

The entire hoist assembly and hydraulic system is mounted in a steel tube 118 which provides the necessary rigidity for the structure beneath the mount. Suitable openings are provided in the tube for access to the various components located therein. The bottom of the tube 118 preferably ends in a bearing surface (not shown) which engages with the mating surface bolted to the loading deck of the ship. This tube further serves as a foundation upon which all of the lower components of the rocket launcher assembly such as the loading platforms 97 are mounted. The tube is bolted to the underside of the platform 70 at 118a and rotates in train with the mount.

Referring to Fig. 6, hydraulic power for operating both the rocket hoist and the cradle is supplied by a 10 H. P. motor 120 driving a 17 gallons per minute vane type pump 121 mounted within an oil storage tank 122, the pump being connected to the motor in tandem. A relief valve 123 set for approximately 1325 lbs./sq. in. and a check valve 124 are also mounted inside the tank.

The tank 122 serves a dual purpose, as it serves as an oil reservoir and as a foundation for mounting the motor 120, pump 121, and valves 123, 124. The tank is of welded steel construction and has a capacity of approximately 16 gallons. Suitable brackets (not shown) are welded to the outside of the tank for mounting on the structural framework inside the tube 118. A large access opening (not shown) is covered by a removable oil tight plate (not shown) to provide access to the units within the tank when the tank is empty.

A spherical accumulator 125 is provided for supplying a reserve of oil at working pressure. The accumulator is of aluminum and has an artificial rubber diaphragm which divides the accumulator into two compartments. In the lower compartment, an initial air pressure of 600 lbs./sq. in. is maintained. Oil admitted to the upper compartment compresses the air to approximately 1200 lbs./sq. in. maximum. When the hydraulic pump motor 120 is stopped, the accumulator pressure remains on the system so that any cycle begun prior to stopping the pump will be completed by oil from the accumulator. In order to relieve pressure in the accumulator 125, a hand valve 126 is provided to allow the oil in the accumulator to flow back into the tank 122. It is the usual practice to open this hand valve after each action and leave the valve in the open condition while the assembly is not in use.

An unloading valve 127 operating in combination with the relief valve 123 maintains the pressure in the accumulator 125 between 1050 and 1200 p. s. i. When pressure reaches 1200 p. s. i., the unloading valve 127 will unbalance the relief valve causing it to open and port the pump discharge to the tank. When the pressure is lowered to 1050 p. s. i., the unloading valve restores balance to the relief valve, thereby closing it and resuming pump discharge into the accumulator 125.

A conventional dual oil filter 128 is connected into the supply side of the oil line.

Solenoid operated control valves 130 and 131 control the direction of oil flow to the cradle operating cylinder 25 and the hoist operating cylinder 84, respectively. These two electrically operated control valves are identical except that one discharge port is blanked off in the hoist control valve 131. Both valves have spring detents 132 and 132a which maintain the valve pistons at either operating position so that the solenoids need be energized only momentarily to position and hold the valves for the entire portion of the operating cycle. Hand plungers 133 and 133a at the top of each valve allow manual shifting of the pistons in one direction. This feature is taken advantage of when it is desired to operate the valve 131 manually to raise the hoist car or to operate valve 130 to raise the cradle to complete a firing cycle in event of electric power failure. A time delay in the operation of the cradle control valve 130 is provided by any conventional means which delays shifting of the main piston of valve 130 to insure that the rockets are clear of the launching tubes before the cradle begins to return to the loading position. This delay is necessitated by the fact that the plungers 40 are released by forward movement of rockets being fired from the tubes before the rockets leave the forward ends of the tubes.

The hydraulic fluid is fed into the valve 130 through port 136, the valve being operable to direct the fluid to the cradle raising port 137 or to the cradle lowering port 138. The fourth port of the valve denoted by the numeral 139 is connected to the tank 122. Operation of valve 130 is under the control of cradle raising solenoid 145 and cradle lowering solenoid 146. Operation of solenoid 145 connects ports 136 and 137 to supply fluid to the lower end of cylinder 25 and operation of solenoid 146 connects ports 136 and 138 to supply fluid to the upper end of cylinder 25 and to connect the lower end of the cylinder to the tank 122 through ports 137 and 139.

The cradle raising port 137 is connected to the lower end of the cradle operating cylinder 25 through a check valve 140 which by-passes a flow control valve 141. The check valve 140 permits the flow of hydraulic fluid from port 137 to the lower end of the cradle operating cylinder but prevents a reverse flow, thereby causing hydraulic fluid flowing from the lower end of the cradle operating cylinder to pass through the flow control valve 141 which serves the purpose of regulating the speed of movement of the piston of the cradle operating cylinder when the cradle is lowered.

The cradle lowering port 138 of valve 130 is connected to the upper end of cylinder 25 through a similar arrangement of check valve 142 and flow control valve 143 which cooperate to regulate the speed of flow of hydraulic fluid out of the upper end of the cradle operating cylinder and thereby to control the speed at which the cradle is moved to the upper or firing position. The leakage lines (unnumbered) of the two flow control valves are connected to the tank 122.

The cradle operating cylinder 25 is a double acting cylinder with equal areas on both sides of the operating piston, the equal areas being attained by the use of a dummy piston rod 25a which extends through the lower end of the cylinder. At the upper end of the piston, the piston rod drives a cross head 25b connected to the cradle operating link 25c which is connected to the crank arm 26. No provision for buffering action is present in the cylinder 25 so that buffering of the cradle movements must be accomplished by buffers 64 and 69 mounted on the dummy gun and on the carriage 20, respectively, as explained above. If desired, the flow control valve and check valve combinations may be replaced by adjustable flow check valves.

The hoist control valve 131 has a port 150 connected to the hydraulic fluid supply, one of its ports 151 blocked, port 152 connected to the lower end of the hoisting cylinder 84, and a fourth port 153 connected to the tank 122. The valve 131 is controlled by a hoist lowering solenoid 156 and a hoist raising solenoid 157. When the solenoid 156 is actuated, ports 150 and 152 are connected and fluid from the pressure source is supplied to the lower end of the hoisting cylinder 84 to lower the hoist lift. Operation of the hoist raising solenoid 157 connects port 152 to port 153 to return oil from the lower end of the hoisting cylinder 84 to the tank 122.

The hoist operating cylinder 84 is of the differential area type, the rod side of the piston being continuously connected to hydraulic fluid under pressure so that the motion of the piston depends upon whether the head or lower side of the piston is connected by the valve 131 to pressure or to the tank. When the head side of the piston is connected to the pressure line by the actuation of solenoid 156, the pressures on both sides of the piston are equal but, due to the area of the head side being greater than the area of the rod side of the piston, a force will be applied to push the piston rod upwardly as shown in Fig. 6. This drives the sheave 86 upwardly and lowers the rocket lifter 81. When the head side of the piston is connected to the tank by the actuation of solenoid 157, the pressure acting on the rod side of the piston forces the piston downwardly and lowers the sheave 86 to raise the rocket lifter 81. Conventional buffering means are provided in each end of the hoisting cylinder 84, comprising a restricted end portion of the cylinder bore cooperating with a tapering projection on each side of the piston 85. Suitable fluid passages containing check valves connect the extreme end portions of the cylinder 84 to the fluid pipes connected to the respective ends of the cylinder as is conventional practice in the hydraulic art.

Since the upper end of the hoisting cylinder 84 is always under pressure from the hydraulic fluid pressure source, two sets of flow controlling valve and check valve combinations 160 and 161 are provided in this line, the valve group 160 serving to regulate the rate of fluid flow into the upper end of the hoist operating cylinder and the valve group 161 serving to regulate the speed of fluid flow from the upper end of the cylinder to the tank 122. Valve group 161, since it regulates the rate at which fluid can be expelled from the upper end of the hoisting cylinder, thereby regulates the rate at which hydraulic fluid can be supplied to the lower end of the cylinder, and thus regulates the rate at which the hoisting car is lowered. Valve group 160 similarly regulates the rate of raising of the hoist car.

The operation of the launcher and its automatic sequence will now be described. Referring to Figs. 6 and 10 of the drawings, the condition of the hydraulic circuit and of the wiring diagram indicates that the rocket launching tubes 27 are empty, the hoist car is not at the top of the hoist and electrical energy is being supplied to solenoid 146 to move the cradle and the launching tubes to the loading position although the solenoid has not yet shifted the piston of valve 130.

It is considered that the operation of the launcher can best be discussed by running through a cycle of its operation, beginning with the launcher tubes empty, the spring loaded plunger 40 extending into the launcher tube, the switches 41a closed, and the switches 41b open. In this condition of the circuit, the solenoid 146 is energized and the cradle control valve 130 is actuated to move the central plunger of the valve downwardly in Fig. 6 to connect port 136 to port 138 to supply pressure to the upper end of the cradle operating cylinder and thereby move the cradle and launching tubes to the loading position. In this condition of the circuit, the hoist car 81 would be at its lower position to which it was moved while the cradle was not in the loading position. The rocket lifter being in its lower position has operated mechanical interlock linkage 95 to unlock the shutters 90 and thereby permit loading of the hoist.

As rockets are loaded into the lower ends of the hoist tubes, the shutters 90 must open to permit passage of the rockets into the hoist tubes and in so opening, the shutters open switches 93, assuring that the hoist lift cannot be raised while the shutters are open. As soon as the rockets are completely in each hoist tube, the respective hoist shutters again close and switches 93 close. The switches 99 which are operated by the treadle plates 98, and which are open as long as the bottom of the respective hoist tube is unloaded, are closed by the positioning of rockets on the treadles 98 and lift arms 82 when the hoists are loaded. The condition of the system is now as follows: Both switches 99 are now in closed condition because the lower ends of both hoists are loaded; both switches 93 are now in closed condition due to the fact that both pairs of shutters 90 are closed; the switch 105 is closed as the cradle and rocket launching tubes are at the loading position; and the switches 41a are closed due to the fact that the launching tubes are empty. The circuit for operating solenoid 157 is thus completed and the piston of valve 131 is moved to its lower position, thereby connecting the lower end of the hoisting cylinder 84 through ports 152 and 153 to the tank 122 and allowing the fluid pressure which is constantly exerted on the upper or rod side of the piston 85 to move the piston 85 downwardly, thus lowering the sheave 86 and raising the hoist car and its load of rockets to its upper position.

When the rocket lift 81 is moved upwardly and the rockets carried thereby are removed from the treadles 98 at the lower ends of the hoist tubes, switches 99 are opened thereby de-energizing solenoid 157. However, the hoist continues moving upwardly since the piston of the hoist control valve 131 remains in the hoisting position due to the presence of the detent 132a. The upward motion of the rocket lift 81 also releases lever 95 to lock the shutters 90 in their closed position, insuring that rockets cannot be placed in the lower ends of the hoist tubes when the hoist lift is not in a position to receive the rockets.

As the rockets are moved upwardly by the hoist into the launching tubes 27, they swing latches 29 outwardly to their open positions by the cam action of the ogives of the rockets moving against the latches and thereby open switches 34 which are in the circuit to the solenoid 145 which controls the raising of the cradle to the firing position. As the switches 34 break the circuit to solenoid 145, they assure that the cradle will not be moved away from the loading position until the rockets are completely in the launching tubes. As the rockets continue to move into the launching tubes, the contacts 41a are opened and the contacts 41b are closed by the outward movement of plunger 40.

As the rocket lifter approaches the end of the hoisting stroke, the switch 102 is opened by the lift striking the operating arm of the switch. This breaks the circuit to the cradle raising solenoid 145 assuring that the cradle remains in the loading position as long as th ehoist car is at the top of the hoist. While the launching tubes are in the loading position they maintain switch 105 closed and switch 106 is open.

When the rockets have been lifted above the latches 29 by the hoist, the latches are rotated into their normal closed positions by the springs 35 which also close switches 34. Since contacts 41b are closed by the presence of the rockets in the tubes, the closing of switches 34 actuates the solenoid 156 which shifts valve 131 to connect fluid pressure to the lower end of the hoist operating solenoid through ports 150 and 152 of the valve 131 and thereby lower the hoist lift.

As soon as the hoist lift leaves the top of the hoist, switch 102 closes, completing the circuit to solenoid 145. This solenoid actuates valve 130 causing fluid pressure to be supplied to the lower end of the cradle operating cylinder 25 and the piston therein is moved upwardly to rotate the cradle and rocket launching tubes toward their firing position. The cut away portions 27a on the lower sides of the rear ends of the rocket launching tubes prevent interference between the tubes and the rocket lifter. The travel of the rocket lifter is such that its uppermost position places the rockets approximately ¼" above the launching tube latches 29, the rockets sliding rearwardly and coming to rest on the latches 29 as soon as the rocket launching tubes are rotated away from the hoist in their movement to the firing position.

As the launching tubes 27 move away from their loading position, the hoist covers 110 are moved to their closed positions by the spring 111 thereby permitting switches 113 in the firing circuit to close. When the launching tubes arrive at their firing position as defined by the dummy gun, the firing interlock switch 60 is closed as screw 47 actuates plunger 61 to fire the rockets from the tubes in the succession dictated by the intervalometer 180. As explained in detail under the description herein of the firing circuit, firing of rockets by the closing of switches 60 takes place only if the other switches in the firing circuit, namely the emergency stop switch 183, the firing switch (not shown), and the firing cut out switch 182 are closed.

As each rocket is fired from the corresponding launching tube, the plunger 40 of the tube is moved inwardly by its spring, the corresponding switch 41b is opened, and the correspondng switch 41a is closed. The operating circuit for the cradle raising solenoid 145 is thus broken by the opening of the switches 41b as the rockets are fired from the tubes. As switch 106 was opened by the movement of the cradle to firing position, the closing of the switches 41a energizes the solenoid 146 which actuates the valve 130 to transmit fluid pressure through ports 136 and 138 to the upper end of the cradle operating cylinder 25 which then returns the launching tubes to the loading position. Since switches 41a may be closed upon inward movement of plungers 40 before the second of the two rockets has emerged completely from its launcher tube, a time delay in the operation of cradle control valve 130 is provided by conventional means to prevent premature movement of the launching tubes away from the dummy gun.

When the cradle and launching tubes arrive at the loading position, the hoist covers 110 are swung open by the action of the rollers 44 on the cam surfaces 112 of the covers and the opening of the covers opens switches 113 in the firing circuit. At this time, if rockets have been placed in the lower end of the hoists after the hoist car returned to the bottom of the hoist, the operating circuit for solenoid 157 is entirely closed and the rocket lifter again is raised and the entire cycle begun again.

The firing circuit (Fig. 11) for the launcher includes the following: a source of electrical current (not shown), a firing switch at the director or other remote control point (not shown), an intervalometer 180 or other means for causing one of the launching tubes to fire a short interval of time after the other, the firing switches 113 operated by the hoist covers 110 to break the firing circuit when the covers 110 are open, a firing transformer 181 which steps down current from 115 v. to 20 v. for firing the projectiles, a suitable firing cutout mechanism designated generally by the numeral 182 of any desired type to assure that the firing circuit is opened and the rockets cannot be fired when they would endanger structure on the ship carrying the launcher, an emergency stop switch 183 of the two pole, single throw snap type having one pole connected in series with the primary circuit of the firing transformer 181 and the other pole connected in the train control circuit of the train power drive (not shown) to provide a means for stopping the mount from below decks in case an operator's clothing becomes caught on the hoist structure or in case the mount runs away, the firing interlock switch 60 which is actuated when plunger 61 is moved upwardly by contact with screw 47 which moves with the rear end of the rocket launching tubes, and the firing contact pins 56 which make contact with the contact bands 170 on the rockets.

Figure 11:
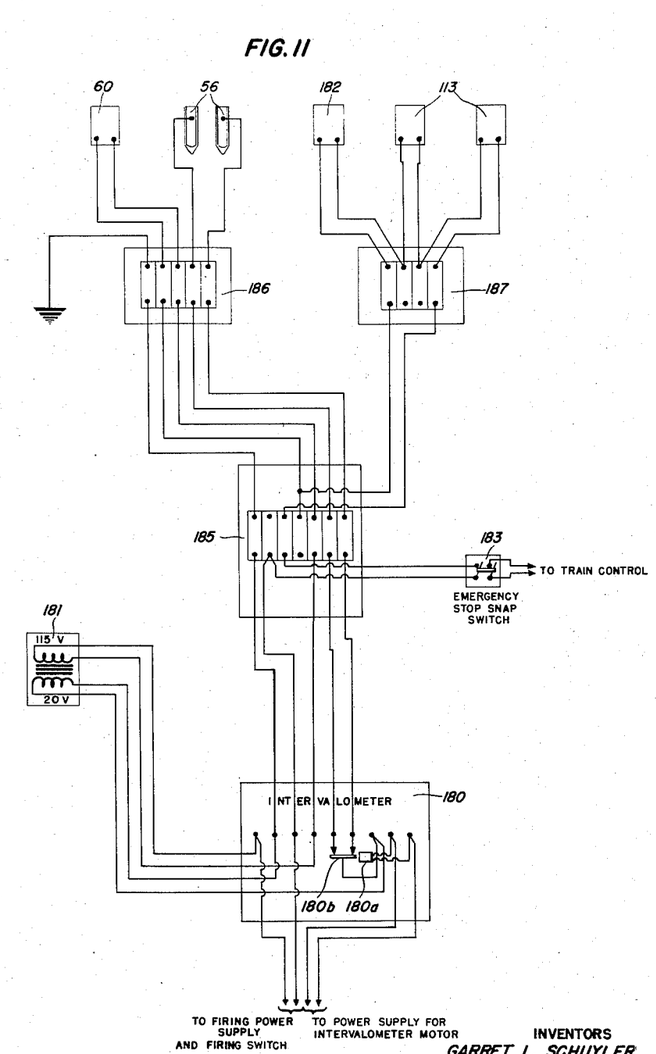
Fig. 11 is a wiring diagram of the firing circuit.

As shown in Fig. 11 power for the firing circuit is supplied to the intervalometer 180 from four leads, two of which are attached to the firing power supply and firing switch and the other two of which are connected to the power supply for the intervalometer motor 180a which will be discussed presently.

The intervalometer 180 may be of any conventional type and in a preferred embodiment consists of a cam drum (not shown) driven by a synchronous motor 180a at a speed of 16 revolutions per minute. The heads of small screws (not shown) which are inserted radially into the cam drum serve to actuate microswitches 180b to open and close the firing circuits to firing contact pins 56 when the drum rotates. The corresponding rows of cam screws are so spaced as to result in an interval of approximately .33 second between actuations of the switches. Each of the microswitches 180b is connected through a ten-wire connection box 185 mounted on the support tube 118 to a five-wire connection box 186 mounted on the dummy gun. The firing contact pins 56 for the launcher tubes are connected to the connection box 186 so as to receive a 20 volt electrical impulse from the secondary circuit of firing transformer 181 everytime the corresponding switch 180b is closed. The emergency stop switch 183 is connected into the connector box 185 and is connected thereby into the primary circuit of the firing transformer 181 as are the hoist cover switches 113 and the firing cutout switch 182 which are connected to the connection box 185 through a branch connection box 187 located on the carriage. The firing interlock switch 60 which controls the time of firing of the rockets is also connected into the primary circuit of the firing transformer 181 through connection boxes 186 and 185.

With the firing switch closed, rockets in the firing tubes will be fired only when both hoist cover switches 113 are closed, the firing cut-out switch 182 is closed indicating that the launching tubes are not pointed toward any of the own ship's structure, and firing interlock switch 60 is closed indicating that the rocket launcher tubes are aligned with the dummy gun. It is also necessary, of course, that the emergency stop snap switch be closed. When all these switches are in closed condition, the two rockets in the two firing tubes are fired approximately .33 second apart by operation of the intervalometer 180.

The ammunition used with the embodiment of the invention described above comprises 5" spin stabilized rockets which are approximately 33.75" in length. The rocket motors are ignited by electrical squibs which have one end grounded and one end connected to a metal band 170 surrounding the base of the rocket and insulated therefrom. The firing circuit is completed through the firing contact pins 56 to the band 170 to the squib (not shown) of the projectile and then to the body of the projectile which is grounded to the launcher tubes by contact with the rails 28 thereof. Such rockets are described in greater detail in a patent application of Clarence E. Weinland, Serial No. 564,337, filed November 20, 1944.

While the invention has been specifically described with reference to use with 5" spin stabilized rocket projectiles, it is to be understod that the invention is not limited to use with such projectiles. It should be understood that the mechanism described herein is merely a preferred embodiment of the invention and that the invention is capable of a variety of embodiments without departing from the spirit of the invention as defined by the appended claims.

The invention herein described may be manufactured and used by or for the Government of the United States of America for governmental purposes without the payment of any royalties thereon or therefor.

We claim:

1. A missile launcher adjustable in train and elevation comprising a missile guide tube, a dummy gun, a missile loading tube, a mounting carriage for said launcher adjustable in train, said guide tube and dummy gun being mounted upon said carriage for independent pivotal movement in elevation, means for rapidly pivoting said guide tube between loading and firing positions and vice versa, said guide tube being in registry and alignment with said loading tube when in loading position, positioning abutments carried by said dummy gun for stopping the guide tube in its pivotal travel from loading to firing position to establish positively and accurately the firing angle of elevation whereby the position of the dummy gun establishes the angle of elevation for the firing position of said guide tube, means for firing missiles loaded in said guide tube upon said guide tube reaching said dummy gun established angle of elevation, fire control means for adjusting said carriage in train and said dummy gun in elevation, and an electrical interlock control circuit for facilitating the operational cycle of the launcher having means for controlling the pivotal movement of said guide tube to bring it into loading position when empty and into firing position when loaded, means for controlling the delivery of missiles placed in said loading tube into said guide tube to load said guide tube when in registry with said loading tube, and means for controlling the firing of missiles thus loaded to fire the same upon said guide tube reaching the established firing angle of elevation, missiles being thereby fired in the desired direction in train by the position of said carriage and in the desired angle of elevation by the position of said dummy gun.

2. A missile launcher adjustable in train and elevation comprising a missile guide tube, a dummy gun, a missile loading tube, a carriage for said launcher adjustable in train, said guide tube and dummy gun being mounted upon said carriage for independent pivotal movement in elevation, means for pivoting said guide tube between loading and firing positions and vice versa, said guide tube being in registry and alignment with said loading tube when in loading position, positioning abutments carried by said dummy gun for stopping the guide tube in its pivotal travel from loading to firing position to establish positively and accurately the firing angle of elevation whereby the position of said dummy gun establishes the angle of elevation for the firing position of the guide tube, means for firing missiles loaded in said guide tube upon said guide tube reaching said dummy gun established angle of elevation, and an electrical interlock control circuit for facilitating the operational cycle of the launcher, said circuit causing said guide tube when empty to pivot into registry with said loading tube, missiles placed in said loading tube to be loaded into said guide tube when in registry with said loading tube, said guide tube when loaded to be pivoted into the firing angle of elevation as established by said dummy gun, the loaded missile to be fired upon said guide tube reaching the firing angle of elevation, and said guide tube to return to loading position after the firing of the loaded missile, missiles being thereby fired in the desired direction in train by the position of said carriage and in the desired angle of elevation by the position of said dummy gun.

3. A missile launcher adjustable in train and elevation comprising a missile guide tube, a dummy gun, a missile loading tube, a carriage for said launcher adjustable in train, said guide tube and dummy gun being mounted on said carriage for independent pivotal movement in elevation, means for pivoting said guide tube between loading and firing positions and vice versa, said guide tube being in registry and alignment with said loading tube when in loading position, positioning abutments carried by said dummy gun for stopping the guide tube in its pivotal travel from loading to firing position to establish positively and accurately the firing angle of elevation whereby the position of said dummy gun establishes the angle of elevation for the firing position of the guide tube, means for firing missiles loaded in said guide tube upon said guide tube reaching said dummy gun established angle of elevation, and means for controlling the pivotal movement of said guide tube to bring it into loading position when empty and into firing position when loaded, missiles being thereby fired in the desired direction in train by the position of said carriage and in the desired angle of elevation by the position of said dummy gun.

4. A missile launcher comprising a missile guide, a dummy gun, a carriage for said launcher, said guide and dummy gun being mounted on said carriage for independent pivotal movement, means for pivoting said guide independently of dummy gun action between a loading and a firing position, and vice versa positioning abutments on said dummy gun for establishing the firing angle of said guide by positively limiting the extent of its pivotal travel from loading position, means for firing loaded missiles from said guide upon said guide reaching said dummy gun established firing angle, means for controlling the pivotal movement of said guide to bring it into loading position when empty and into firing position when loaded, and loading means for loading a missile into said guide when the latter is in load position, missiles being thereby fired at the desired firing angle by the position of said dummy gun.

5. A missile launcher comprising a missile guide, a dummy gun, a mounting for said launcher, said guide and dummy gun being carried by said mounting for independent movement, means for moving said guide independently of dummy gun action between a loading and a firing position and vice versa, positioning abutments on said dummy gun for the firing position of said guide by positively limiting the extent of its movement from loading position, means for firing loaded missiles from said guide when in dummy gun established firing position, and loading means for loading a missile into said guide when the latter is in loading position, missiles being thereby fired in the desired firing direction by the position of said dummy gun.

6. A missile launcher comprising a missile guide tube for directing the initial course of missiles loaded therein, a dummy gun for establishing the firing angle of elevation of said guide tube, a mount for carrying said guide tube and dummy gun pivotally in elevation, said mount being adjustable in train, said dummy gun being adjustable in elevation upon said mount, means for pivoting said guide tube in elevation upon said mount independently of dummy gun action between a loading position and a firing position and vice versa, abutment means carried by said dummy gun for stopping said guide tube in its pivotal movement from loading position upon reaching the desired firing angle of elevation, means for firing loaded missiles upon said guide tube reaching the firing angle of elevation, and means for adjusting said mount into desired train and said dummy gun into desired elevation positions, the position of said mount in train and said dummy gun in elevation thereby establishing the direction of firing of missiles.

7. A missile launcher comprising a missile guide for directing the initial course of loaded missiles, a dummy gun for establishing the firing position of said guide, a mount for carrying said guide and dummy gun movably thereon, said dummy gun being adjustable in position upon said mount, means for moving said guide upon said mount independently of dummy gun action between a loading position and a firing position, means carried by said dummy gun for stopping said guide in its movement from loading position upon reaching the desired firing position, means for firing loaded missiles with said guide in the established firing position, and means for adjusting said dummy gun in desired position, the position of said dummy gun thereby delineating the direction of firing of missiles.

8. A missile launcher comprising a missile guide for directing the initial course of loaded missiles, a guide stop means for establishing the firing position of said guide, a mount for carrying said guide and stop means movably thereon, said stop means being adjustable in position upon said mount, means for moving said guide upon said mount independently of the action of said stop means between a loading position and a firing position, said stop means halting said guide in its movement from loading position upon reaching the desired firing position, and means for firing loaded missiles with said guide in the established firing position, the determined position of said stop means thereby delineating the direction of firing of missiles.

9. A missile launcher for rapid firing of missiles comprising a mount, a guide tube pivotally carried thereby about an axis transverse to the longitudinal axis of said tube, a dummy gun carried by said mount for corresponding pivotability, means for adjusting said dummy gun to a desired pivot angle, means for pivotally oscillating said guide tube independently of said adjustment means between a loading position and a firing position, the firing position of said guide tube being defined by the position of said dummy gun, and abutment means cooperating with said dummy gun to stop the pivotal movement of said tube upon its reaching the firing position defined by said dummy gun, the position of said dummy gun thus establishing the firing angle with relation to one fire control plane and adjustment of said mount establishing the firing angle with relation to a second fire control plane.

10. A missile launcher for rapid firing of missiles comprising a mount, a missile guide pivotally carried thereby about an axis transverse to the longitudinal axis of said guide, a guide stop means carried by said mount for corresponding pivotability, means for adjusting said stop means to a desired pivot angle, and means for pivotally oscillating said guide independently of said adjustment means between a loading position and a firing position, the pivotal movement of said guide from loading position being halted upon its abutment with said stop means to define the firing position, the position of said stop means thus establishing the firing angle with relation to one fire control plane and adjustment of said mount establishing the firing angle with relation to a second fire control plane.

11. A rapid fire missile launcher comprising a mount, guide means pivotally carried thereby for controlling missiles in their initial course after firing, guide directing means adjustably carried by said mount, and means for oscillating said guide means independently of movement of said directing means between a loading and a firing position, said directing means positively limiting the extent of pivotability of said guide means in one direction of movement, this limit of movement being the firing position, the adjustment of said directing means thereby defining the firing position of said guide means.

12. A rapid fire missile launcher comprising a guide means movably mounted for controlling missiles in their initial course after firing, a guide directing means adjustably mounted, and means for oscillating said guide means independently of movement of said directing means between a loading and a firing position, said directing means positively limiting the extent of movement of said guide means in one direction, said limit of movement being the firing position, the adjustment of said directing means thereby defining the firing angle of said guide means.

13. In combination: a missile launcher having a movable mount, a missile launching guide movably carried by said mount for controlling the initial flight of missiles after firing, means for independently oscillating said launching guide between a firing and a loading position, and a guide directing means adjustably carried by said mount for determining the firing position of said launching guide by defining the limit of its movement from loading position; and a missile loading means comprising a loading guide affixed to said mount and movable therewith, the loading position of said launching guide placing it in registry with the delivery end of said loading guide, a missile transporter cooperating with said loading guide to load missiles into said launching guide, and an electrical control system for effecting the loading of missiles into said launching guide when in registry with said loading guide and preventing the delivery of missiles thereto when not in loading position.

14. In combination: a missile launcher having a movable missile launching guide for controlling the initial flight of missiles after firing, means for independently oscillating said launching guide between a firing and a loading position, and an adjustable guide directing means for determining the firing position of said launching guide by defining the limit of movement thereof from loading position; and a missile loading means comprising a loading guide, the loading position of said launching guide placing it in registry with the delivery end of said loading guide, a missile transporter cooperating with said loading guide to load missiles into said launching guide, and an operational control system for effecting the loading of missiles into said launching guide when in registry with said loading guide and preventing the delivery of missiles thereto when not in loading position.

15. In a missile launcher having a mount and a missile launching guide independently oscillatable between a firing and a loading position for controlling the initial flight of missiles after firing; a missile loading means comprising a loading guide affixed to said mount for movement therewith, the loading position of said launching guide placing it in registry with the delivery end of said loading guide for all positions of said mount, a missile transporter cooperating with said loading guide to load missiles into said launching guide, and an operational control system for causing the transporter to deliver a missile into said launching guide when in registry with said loading guide and preventing the delivery of missiles thereto when not in loading position.

References Cited in the file of this patent

UNITED STATES PATENTS

| | | |
|---|---|---|
| 37,364 | Stevens | Jan. 6, 1863 |
| 669,896 | Dawson et al. | Mar. 12, 1901 |
| 691,254 | Foote | Jan. 12, 1902 |
| 743,881 | Jones | Nov. 10, 1903 |
| 932,030 | Krone et al. | Aug. 24, 1909 |
| 1,373,381 | Cooke | Mar. 29, 1921 |
| 1,422,678 | Dawson et al. | July 11, 1922 |
| 1,434,044 | Cooke | Oct. 31, 1922 |
| 1,612,118 | Hewlett et al. | Dec. 28, 1926 |
| 2,004,855 | Daum | June 11, 1935 |
| 2,359,517 | Gebeau | Oct. 3, 1944 |
| 2,376,358 | Horsrud | May 22, 1945 |